United States Patent [19]
Yamano et al.

[11] Patent Number: 5,581,537
[45] Date of Patent: Dec. 3, 1996

[54] INFORMATION RECORD/REPRODUCING APPARATUS AND INFORMATION RECORDING MEDIUM

[75] Inventors: Akihiko Yamano, Yokohama; Hiroyasu Nose, Zama; Toshimitsu Kawase, Atsugi; Toshihiko Miyazaki, Isehara; Takahiro Oguchi, Atsugi, all of Japan

[73] Assignee: Canon Kabushiki Kaisha, Tokyo, Japan

[21] Appl. No.: 281,265

[22] Filed: Jul. 27, 1994

Related U.S. Application Data

[63] Continuation of Ser. No. 953,202, Sep. 29, 1992, abandoned, which is a continuation of Ser. No. 513,931, Apr. 24, 1990, abandoned.

[30] Foreign Application Priority Data

| Apr. 25, 1989 | [JP] | Japan | 1-103453 |
| Apr. 5, 1990 | [JP] | Japan | 2-91452 |

[51] Int. Cl.⁶ .................................................. G11B 9/04
[52] U.S. Cl. .......................................... 369/126; 369/101
[58] Field of Search ........................ 360/97.02; 365/151; 369/126, 101; 236/44 E, 44 R; 250/306

[56] References Cited

U.S. PATENT DOCUMENTS

| 3,170,083 | 2/1965 | Newberry | 315/31 |
| 3,226,696 | 12/1965 | Dove | 340/173 |
| 3,843,967 | 10/1974 | Mulvany | 360/98 |
| 4,575,822 | 3/1986 | Quate | 365/174 |
| 4,700,198 | 10/1987 | Shirahata et al. | 346/1.1 |
| 4,825,316 | 4/1989 | Kishi et al. | 360/97.02 |
| 4,831,614 | 5/1989 | Duerig et al. | 369/101 |
| 4,962,480 | 10/1990 | Ooumi et al. | 369/126 X |
| 5,012,360 | 4/1991 | Yamauchi et al. | 360/97.02 |

FOREIGN PATENT DOCUMENTS

| 0174860 | 3/1986 | European Pat. Off. . |
| 0272935A2 | 6/1988 | European Pat. Off. . |
| 0307210 | 3/1989 | European Pat. Off. . |
| 0307211 | 3/1989 | European Pat. Off. . |
| 3539196 | 7/1986 | Germany . |
| 0253109 | 1/1988 | Germany | 360/97.02 |
| 63-161553 | 7/1988 | Japan . |
| 63-161552 | 7/1988 | Japan . |
| WO8907256 | 8/1989 | WIPO . |
| 9005974 | 5/1990 | WIPO | 360/97.02 |

OTHER PUBLICATIONS

"Scanning tunneling microscopy", G. Binnig et al., Helvetia Physica Acta, vol. 55 (1982) pp. 726–735.
"Silicon as a Mechanical Material" by K. E. Peterson, Proceedings of the IEEE, vol. 70, No. 5, pp. 420–457.

*Primary Examiner*—Stuart S. Levy
*Assistant Examiner*—Paul J. Ditmyer
*Attorney, Agent, or Firm*—Fitzpatrick, Cella, Harper & Scinto

[57] ABSTRACT

An improvement on the information record/reproducing apparatus, utilizing a tunnel current generated in a flat information recording medium by a needle-shaped probe electrode positioned close to the recording medium. In order to prevent deterioration of the probe and the recording medium by the atmosphere, these components are hermetically sealed in a container, with or without the driving mechanism. The sealed structure is made detachable from the main apparatus, thus facilitating manufacture, replacement and maintenance.

52 Claims, 11 Drawing Sheets

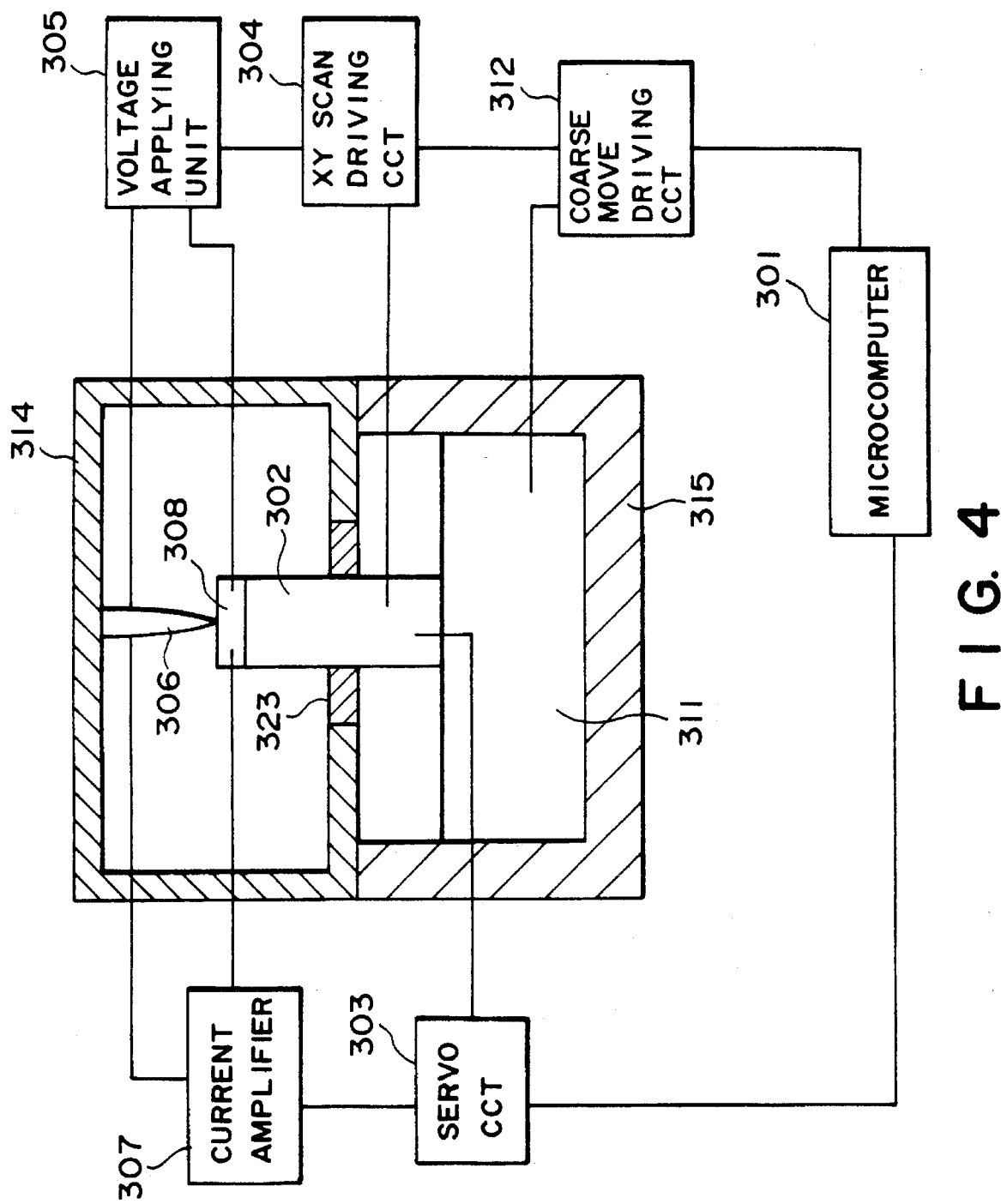
F I G. 4

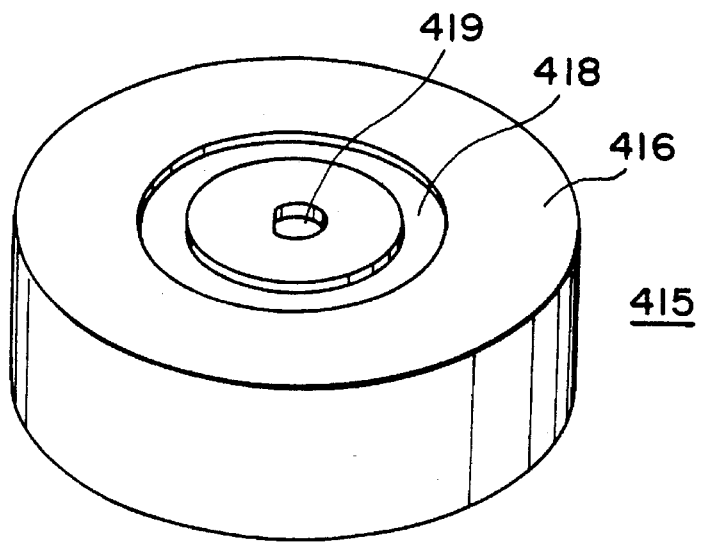
F I G. 6
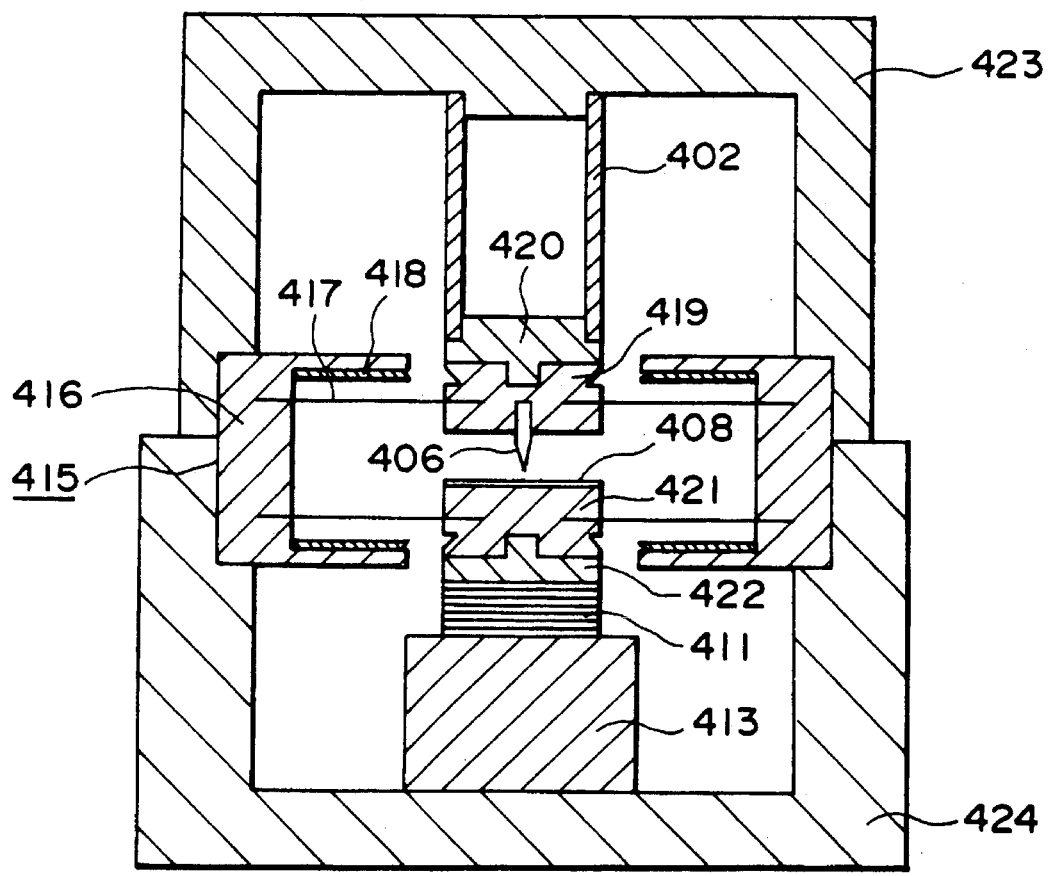
F I G. 8

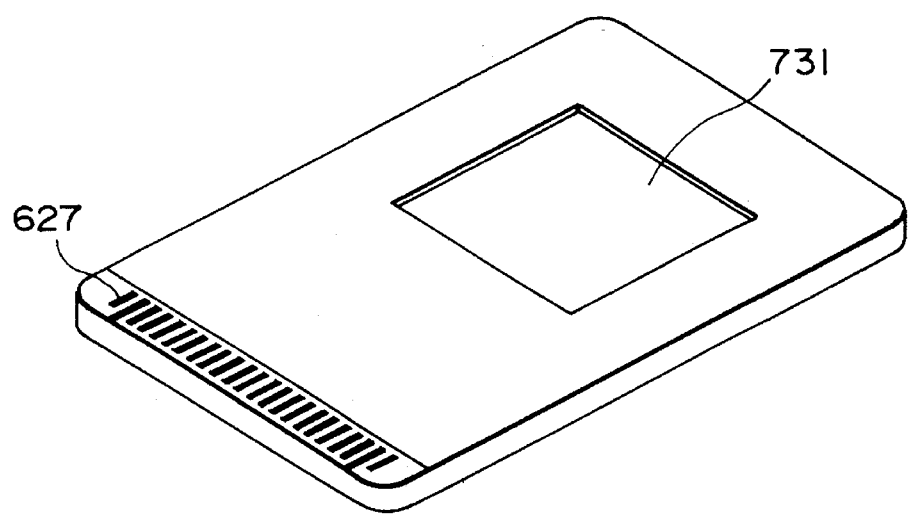
F I G. 11
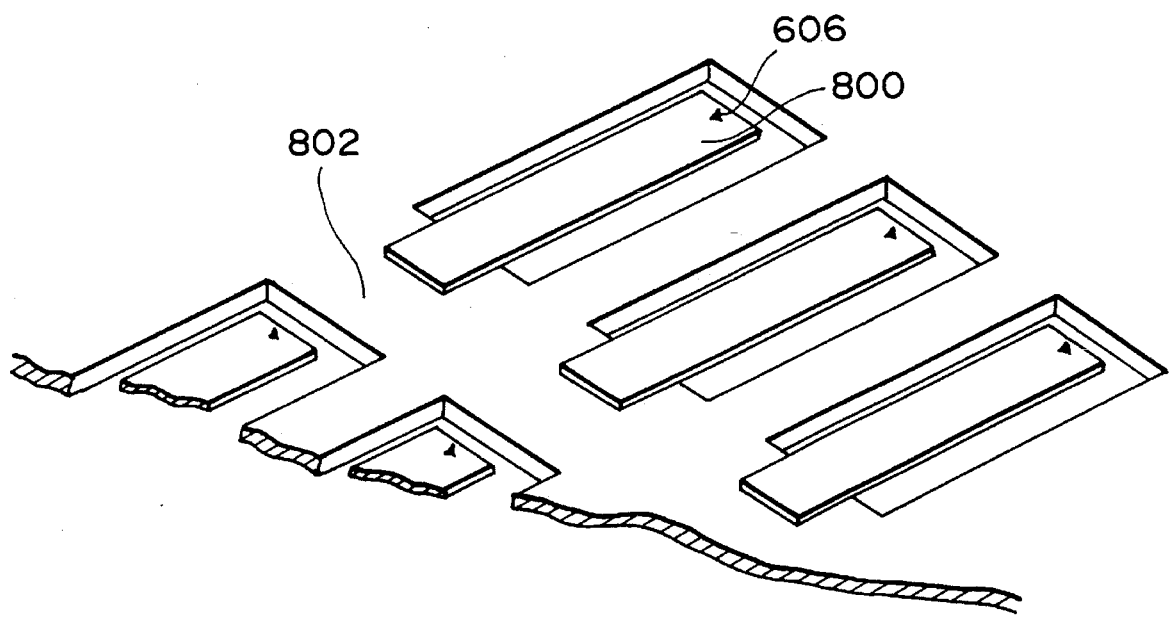
F I G. 12

INFORMATION RECORD/REPRODUCING APPARATUS AND INFORMATION RECORDING MEDIUM

This application is a continuation of application Ser. No. 07/953,202 filed Sep. 29, 1992, now abandoned, which is a continuation of application Ser. No. 07/513,931 filed Apr. 24, 1990, abandoned.

BACKGROUND OF THE INVENTION

1. Field of the Invention

The present invention relates to an apparatus for recording or reproducing information, and an information recording medium for use therein.

2. Related Background Art

Recently developed scanning tunnel microscope (hereinafter called STM) for directly observing electron structure on the surface of a material or in the vicinity of the surface, as disclosed by G. Binning et al., Helvetica Physica Acta, 55, 726 (1982), allows measurement of real space image with a high resolving power, regardless whether said material is monocrystalline or amorphous. Various applications are anticipated because of the advantages that the observation can be conducted with a low electric power without damage to the object by electric current, and that said microscope is usable not only in ultra high vacuum but also in the air or in solution and for various materials.

Also there have been developed information record/reproducing apparatus utilizing such scanning tunnel microscope, as disclosed in the Japanese Laid-open Patents Sho 63-161552 and Sho 63-161553.

Such known record/reproducing apparatus has a structure as shown in FIG. 1.

In such apparatus, a DC voltage is given a recording medium 8 so as to generate a tunnel current by means of a voltage applying unit 5, and the distance between a probe electrode 6 and said recording medium 8 is so controlled as to obtain a constant tunnel current. A pulse voltage is given across the recording medium 8 having a switching memory effect for forming a local area of different electric resistance at a desired recording position.

At the reproducing operation, the distance between the probe electrode 6 and the recording layer is controlled at a constant value, under the application of a small voltage, by means of a current amplifier 7, a servo circuit 3 and a three-dimensional driving mechanism 2. The surface of the recording medium is scanned by an X-Y scanning drive circuit 4 and the three-dimensional driving mechanism 2 while the probe electrode 6 runs on said surface so as to provide a constant detection current, and the recorded information is reproduced on the basis of both the Z-axis control amount corresponding to the difference in electric resistance formed in the recording operation and the position of the probe electrode on said surface. Such controls are conducted by a microcomputer 1. Since the tunnel current starts to flow only when the distance between the probe electrode 6 and the recording medium 8 becomes as small as about 1 nm, highly precise manufacturing technology is required for the control mechanisms for said probe electrode 6 and recording medium 8. In FIG. 1 there are further shown base electrode 9, a substrate 10, a coarse moving mechanism 11, a coarse driving circuit 12, and an X-Y stage 13.

In such conventional record/reproducing apparatus, the surface of the recording medium and that of the probe electrode are exposed to the air. Consequently, the eventualy deterioration of said surfaces caused by the moisture or oxygen in the air gives rise to errors in information reproduction and significant deterioration in S/N ratio. Also the surface of the recording medium may be damaged or smeared by the dusts in the air, eventually causing errors in the information recording or reproduction.

SUMMARY OF THE INVENTION

The present invention is an improvement on the above-explained prior technology, and its first object is to provide an apparatus for information recording and/or reproduction, capable of preventing the deterioration of the surface of the recording medium and/or the probe electrode, thereby maintaining highly precise and reliable functions.

A second object of the present invention is to provide an information recording medium which can be loaded into or detached from the information record/reproducing apparatus, without change in the relative relationship between the surface of the recording medium and the probe electrode or in the ambient atmosphere of at least one of said surface and said probe electrode.

Other objects of the present invention will become fully apparent from the following description of the preferred embodiment.

BRIEF DESCRIPTION OF THE DRAWINGS

FIG. 4 is a schematic view of a record/reproducing apparatus of a third embodiment of the present invention;

FIG. 6 is an external view of a sealed container in said embodiments;

FIGS. 7 and 8 are views showing the mode of setting of the sealed container in said embodiments;

FIG. 11 is an external view of a card-shaped unit employed in a sixth embodiment of the present invention;

FIG. 12 is a schematic view of a driving mechanism for probe electrodes in said embodiment;

DETAILED DESCRIPTION OF THE PREFERRED EMBODIMENTS

In the embodiments of the present invention to be explained later, there is employed a sealed structure at least enclosing the recording medium and the probe electrode opposed to said recording medium.

The interior of the sealed structure is separated from the ambient atmosphere, so that deterioration by moisture or oxygen can be prevented.

The sealed structure may contain not only the probe electrode and the recording medium but also other mechanisms such as a scanning mechanism and an electric circuit.

The interior of the sealed structure is filled with various gasses or liquids, or maintained in vacuum state. Said gas or liquid may be air purified with an air filter, but is preferably a clean material having sufficient electric insulating property and free from moisture. Examples of such material is dried nitrogen gas, or cleaned paraffin oil.

Figure 1:
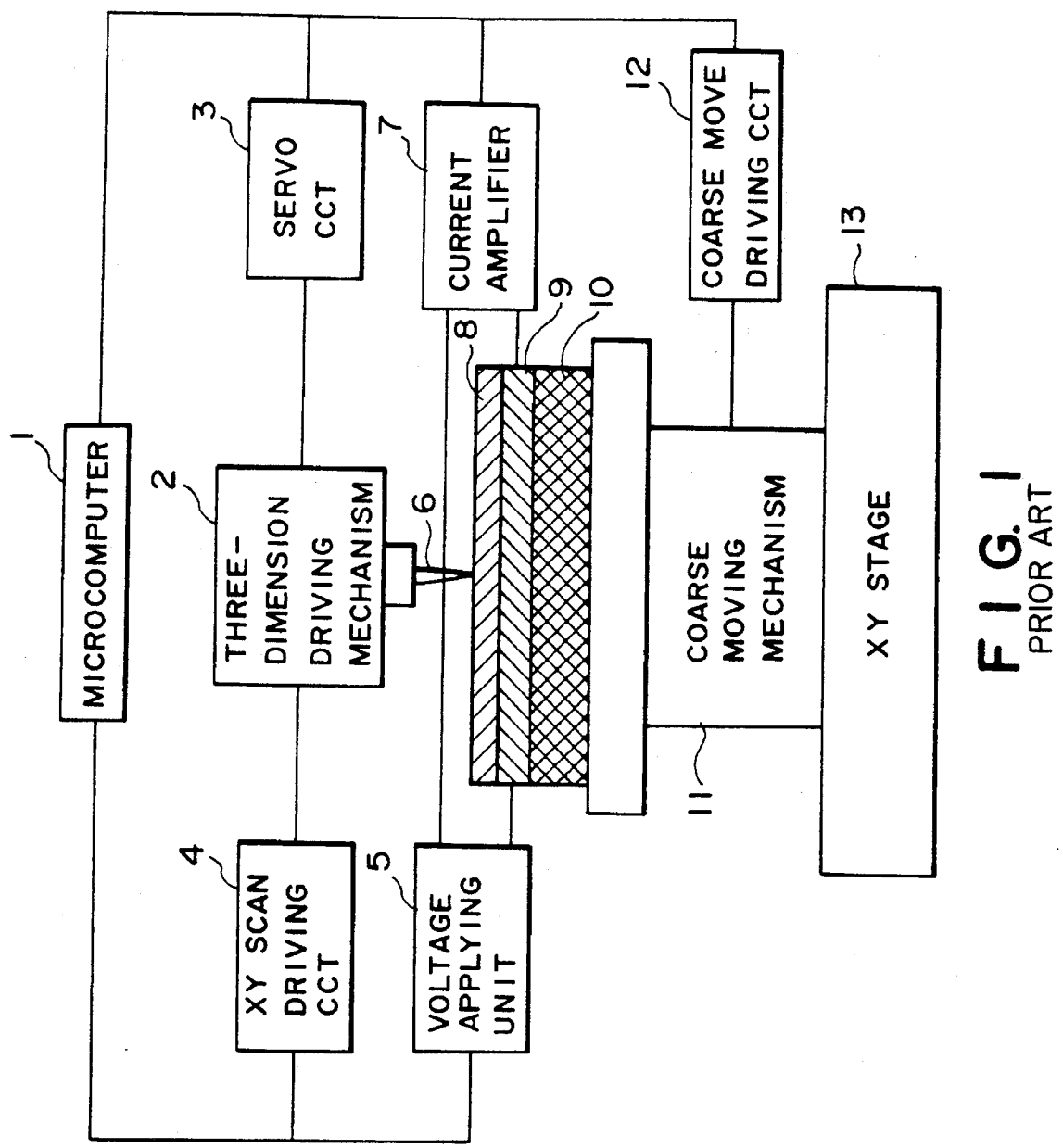
FIG. 1 is a schematic view of a conventional structure.
Figure 2:
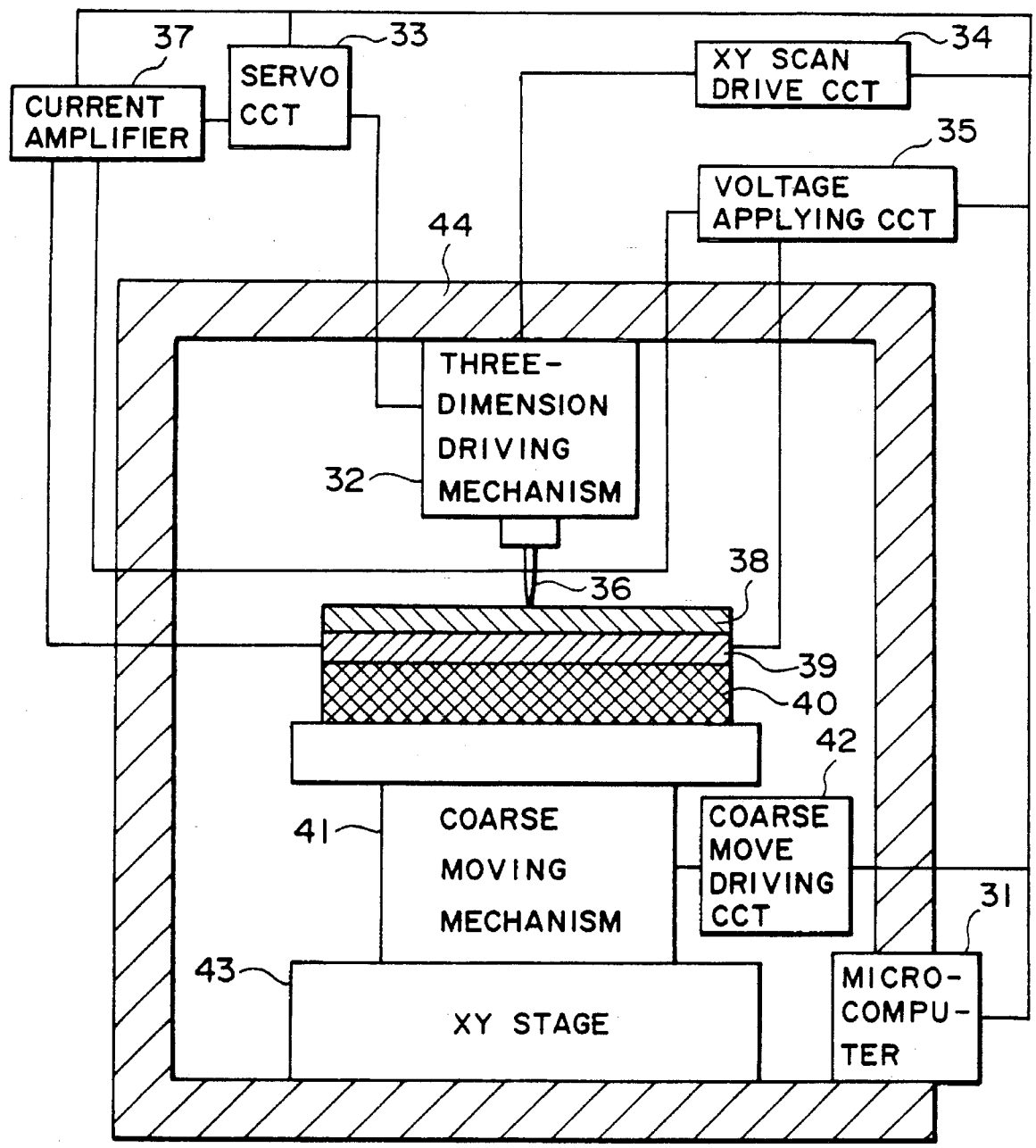
FIG. 2 is a schematic view of a record/reproducing apparatus and a recording medium in a first embodiment of the present invention.

FIG. 2 is a schematic view of the record/reproducing apparatus and the recording medium in a first embodiment of the present invention, wherein shown are a microcomputer 31 for controlling the entire apparatus; a three-dimensional driving mechanism 32 composed of a cylindrical piezoelectric element; a servo circuit 33; an X-Y scanning drive circuit 34; a voltage applying unit 35 across the recording medium; a probe electrode 36 prepared by electrolytic polishing of a tungsten wire; a current amplifier 37; a recording medium 38; a base (or bottom) electrode 39; a substrate 40; a coarse movement mechanism 41 composed of a stepping motor and a lever structure; a coarse movement mechanism driving circuit 42; an X-Y stage 43; and a sealed frame 44 constituting the sealed structure. The probe 36 is brought close to the recording medium 38 by the coarse movement mechanism 41, and a rectangular voltage pulse of a height of 3 volts and a duration of 50 ns is applied by the voltage applying unit 35, whereby the recording medium 38 causes a change in the property, thus forming an area of lower electric resistance. The information recording on the surface of the recording medium can be achieved by effecting the above-explained operation over desired positions on the recording medium, under scanning motion by the X-Y stage 43 and the three-dimensional driving mechanism 32. At the reproduction of informtion, a CD voltage of 200 mV, lower than the voltage at recording, is applied to the recording medium 38. Two-dimensional scanning is conducted on the recording medium as in the recording operation, with feedback control of the distance between the probe electrode 36 and the recording medium 38 by the three-dimensional driving mechanism 32 in such a manner that the current detected by the current amplifier 37 and the servo circuit 33 is maintained at a constant level (0.1 nA). The amount of feedback (or driving amount) increases or decreases in accordance with the information recorded on the medium, so that the information can be reproduced by correlating said amount with the recording position. These controls are conducted by the microcomputer 31.

In the present embodiment, the recording medium 38 is prepared by depositing, on a quarts glass substrate, chromium in a thickness of 50 Å as the base electrode 39 by vacuum evaporation, then depositing gold (Au) in a thickness of 300 Å by the same method, and depositing four layers of SOAZ ( squarelium-bis-6-octylazulene ) by LB method.

In the sealed structure there is sealed dried and purified nitrogen gas.

In the present embodiment, the sealed frame contains not only the probe electrode 36 and the recording medium 38, but also the three-dimensional driving mechanism 32 for driving said probe electrode, and the coarse movement mechanism 14 and the X-Y stage 43 for driving the recording medium.

Figure 3:
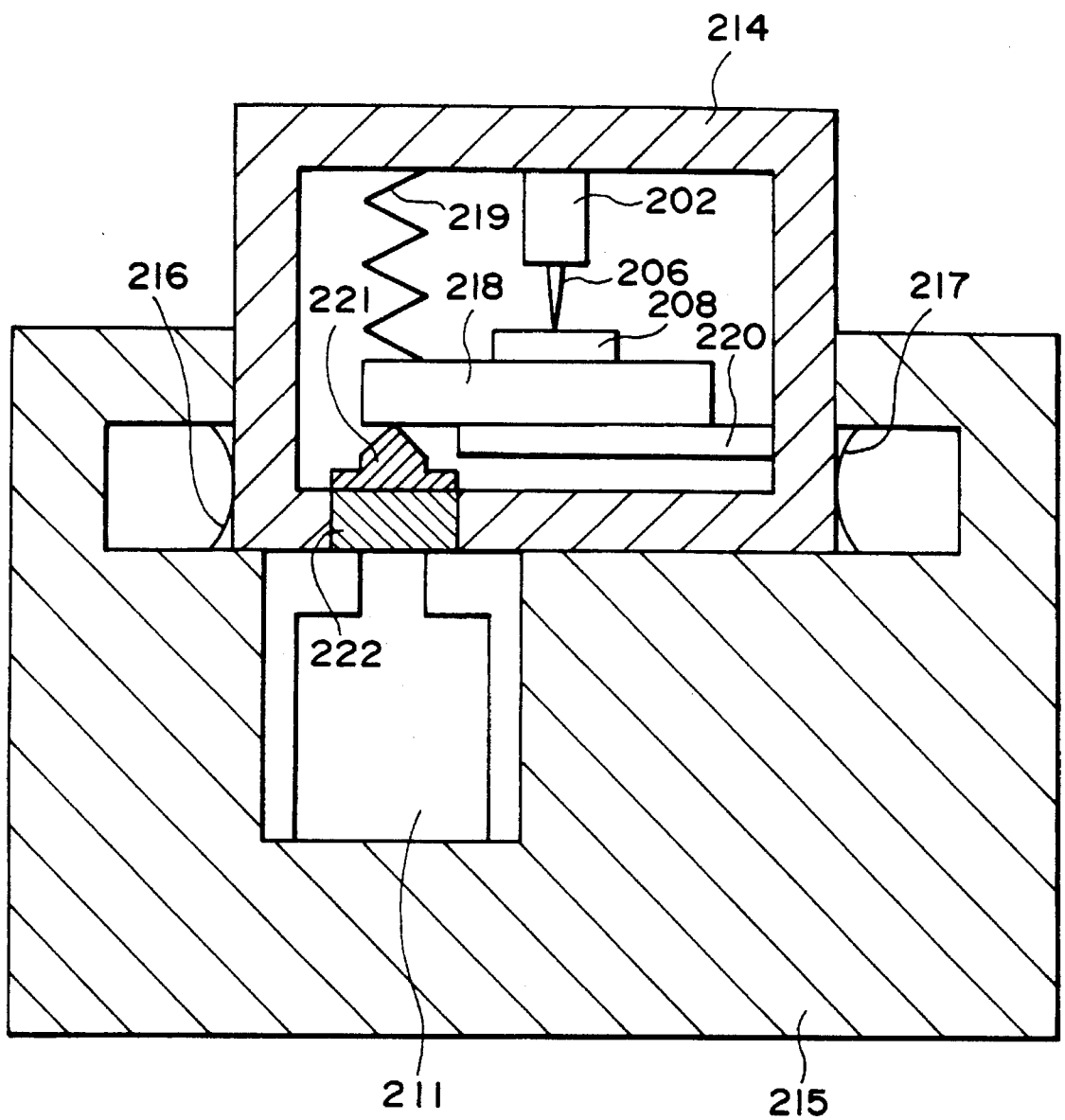
FIG. 3 is a schematic view of a record/reproducing apparatus of a second embodiment of the present invention.

FIG. 3 is a cross-sectional view of a record/reproducing apparatus constituting a second embodiment the present invention. In the present embodiment, a first sealed frame 214 is detachably fixed, by two plate springs 216, 217, to a second sealed frame 215 provided on the main body of the apparatus. A three-dimensional fine movement mechanism 202, a probe electrode 206, a recording medium 208 and a medium support 218 are separated from the ambient atmosphere by the upper sealed frame 214. The microcomputer controlling the entire apparatus is positioned outside the first sealed frame 214, and is not illustrated. The servo circuit, X-Y scanning drive circuit, voltage applying unit and current amplifier are positioned and connected in the same manner as in the first embodiment, and are therefore omitted from the drawing. The recording medium 208 is provided with the base electrode and the substrate at the lower side thereof, as in the first embodiment.

The sealed space is filled with clean paraffin oil. The medium support 218 is supported by a plate spring 220, a pressure spring 219 and a pressure member 221. The distance between the probe electrode 206 and the recording medium 208 can be controlled by moving the pressure member 221 by the coarse movement mechanism 211. At the recording and reproduction, said distance is reduced to the stroke of the three-dimensional fine movement mechanism 202, and the scanning operation along the surface of the recording medium and the relative position control in the axial direction of the probe electrode at the information reproduction are conducted by the three-dimensional fine movement mechanism. A rubber member 222 is provided for extending the movable range of the pressure member 221.

In the present second embodiment, the three-dimensional fine movement mechanism 202, probe electrode 206 and recording medium 208 are similar to those in the first embodiment, and the coarse movement mechanism 211 is composed of a laminated piezoelectric element.

In the present embodiment, since the three-dimensional fine movement mechanism 205, probe electrode 206 and recording medium 208 are enclosed in the detachable first sealed frame 214, and can be replaced together with the first sealed frame at the replacement of the recording medium, so that the sealed state of said frame need not be changed at the replacement of the recording medium. Also the probe electrode 206 and the recording medium 208 are rendered replaceable in a closely positioned state, the alignment of said probe electrode and recording medium can be made promptly after the loading of the frame.

Also the structure of the present embodiment, in which the probe electrode 206 and the recording medium 208 requiring high precision are constructed as a unit, allows to manufacture said unit in a process separate from that for the coarse movement mechanism, circuits and interfaces not requiring high precision. Thus the assembling of the apparatus is facilitated and the productivity is improved. Also the parts of high precision can be replaced by the detaching of said unit, so that the maintenance work is facilitated in case of a failure.

FIG. 4 is a schematic view of a third embodiment of the present invention, wherein shown are a microcomputer 301 for controlling the entire apparatus; a three-dimensional driving mechanism 302 composed of a cylindrical piezoelectric element; a servo circuit 303; an X-Y scanning drive circuit 304; a voltage applying unit 305 for the recording medium; a probe electrode 306 prepared by electrolytic polishing of a tungsten wire; a current amplifier 307; a recording medium 308; a coarse movement mechanism 311 including a stepping motor and a lever mechanism; a coarse movement mechanism driving circuit 312; a sealed frame 314 constituting a sealed structure; a frame member 315 of the apparatus; and an O-ring 323 for maintaining the hermeticity. The recording medium 308 is provided with a base electrode and a substrate at the lower side thereof as in the first embodiment.

The distance between the probe electrode 306 and the recording medium 308 is so controlled as to obtain a constant tunnel current between these members, between which a voltage is applied by the unit 305. That is, the coarse movement mechanism 311 and the three-dimensional driving mechanism 302 are driven according to the output signal of the servo circuit 303 receiving a tunnel current information signal, thereby controlling the relative distance between the probe electrode and the recording medium. The scanning motion on the surface of the recording medium is conducted by the X-Y scanning drive circuit 304 and the three-dimensional driving mechanism 302, with the probe electrode being so driven as to run on the surface recording pattern of the recording medium, and the recorded information is reproduced on the basis of both the position of the probe electrode within the surface of the recording medium and the amount of control on the distance between the probe electrode 306 and the recording medium 308 (corresponding to the change in physical property).

In the embodiment shown in FIG. 4, the three-dimensional fine movement mechanism 303, probe electrode 306 and recording medium 308 are similar to those employed in the first embodiment, and the coarse movement mechanism 311 is composed of a laminated piezoelectric element.

Figure 5:
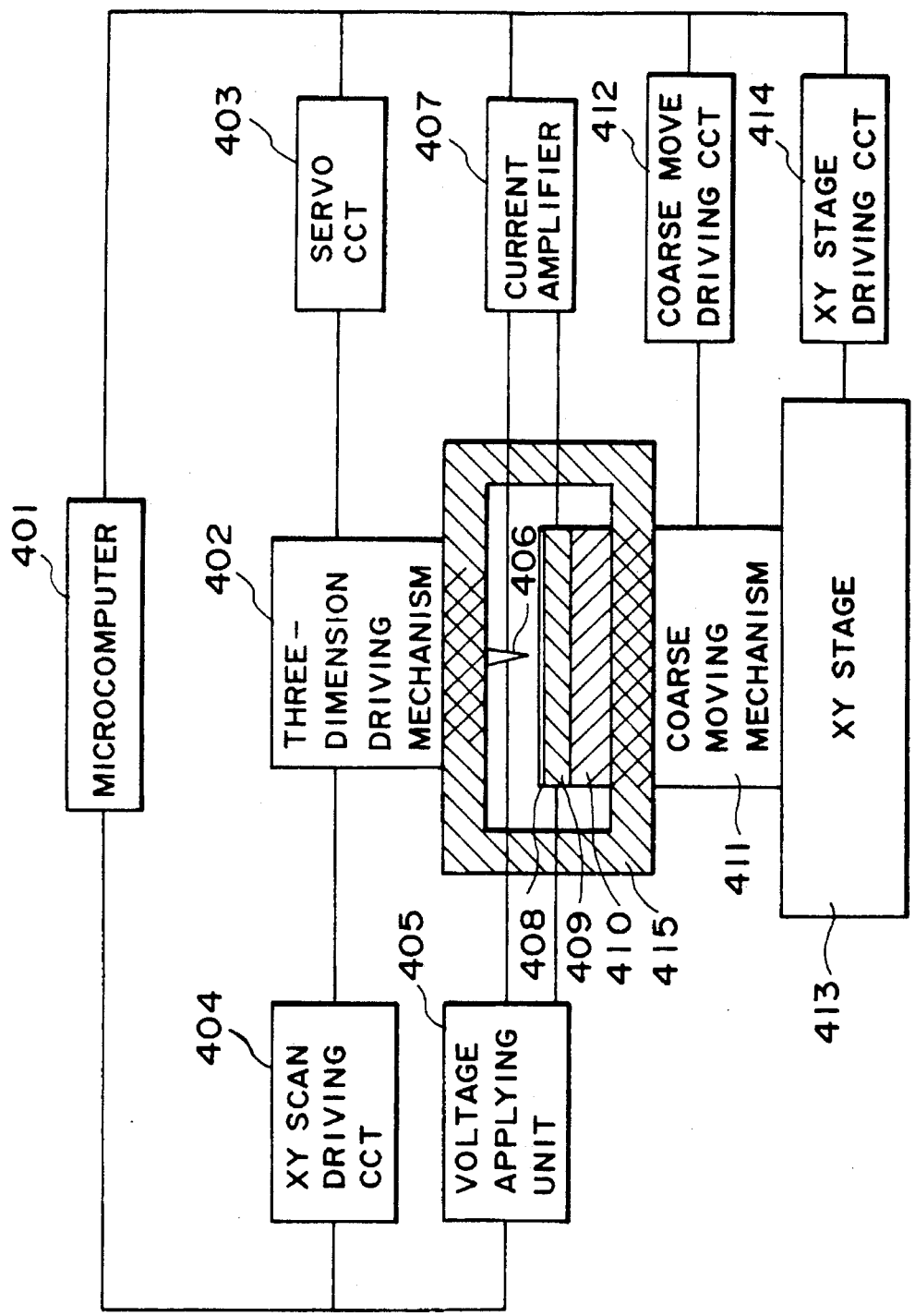
FIG. 5 is a schematic view of a record/reproducing apparatus of a fourth embodiment of the present invention.

FIG. 5 is a schematic view of a fourth embodiment of the present invention, wherein shown are a microcomputer 401 for controlling the entire apparatus; a three-dimensional driving mechanism 402 composed of a cylindrical piezoelectric element; a servo circuit 403; an X-Y scanning drive circuit 404; a voltage applying unit 405 for applying a voltage between the probe electrode and the recording medium; a probe electrode 406 prepared by electrolytic polishing of a platinum wire; a current amplifier 407; a recording medium 408 having four films of SOAZ (squarelium-bit-6-octylazulene) formed by LB method; a base electrode 409 composed of Cr of 50 Å in thickness deposited by vacuum evaporation and Au of 4000 Å in thickness deposited thereon by the same method; a quartz glass substrate 410; a coarse movement mechanism 411 composed of a laminated piezoelectric element; a coarse movement mechanism driving circuit 412; an X-Y stage 413; an X-Y stage driving circuit 414; and a sealed container 415 constituting a sealed structure filled with dried and purified nitrogen gas.

The information recording on the recording medium 408 is achieved by positioning the recording medium 408 close to the probe electrode 406 by means of the coarse movement mechanism 411, and applying a rectagular voltage pulse of a height of 3.5 V and a duration of 50 ns by the voltage applying unit 405, thereby causing a change in the property of the medium 408 and generating an area of lower electric resistance, corresponding to a bit. Said recording is conducted by applying the pulse to a desired position, with the relative scanning motion of the probe electrode 406 and the recording medium 408 by means of the three-dimensional driving mechanism 402 and the X-Y stage 413.

The information reproduction is achieved by applying a DC voltage of 200 mV, lower than the recording voltage, between the probe electrode 406 and the recording medium 408, while the surface of the recording medium is two-dimensionally scanned, as in the recording operation, with feedback control of the Z-position of the three-dimensional driving mechanism 402, namely the distance between the probe electrode 406 and the recording medium 408 in such a manner that the current detected by the current amplifier 407 and the servo circuit 403 becomes constant at 0.1 nA. The amount of feedback (the amount of drive in the Z-direction) corresponds to the information recorded on said medium, and the reproduction is conducted by correlating said amount with the recording position. These controls are conducted by the microcomputer 401.

FIG. 6 is an external view of the sealed container 415 detached from the apparatus of the fourth embodiment. Said container contains the probe electrode and the recording medium in mutually opposed relationship, filled with purified dry nitrogen gas, and is further provided with a locking plate 418 for preventing the mutual collision of the probe electrode and the recording medium, and a probe socket 419 having a D-shaped hole for connection with the three-dimensional driving mechanism for causing the scanning motion of the probe electrode. Said D-shaped hole is positioned on the axis of the cylindrical sealed frame 416. In the following there will be explained the setting of the sealed container 415 into the apparatus.

Figure 7:
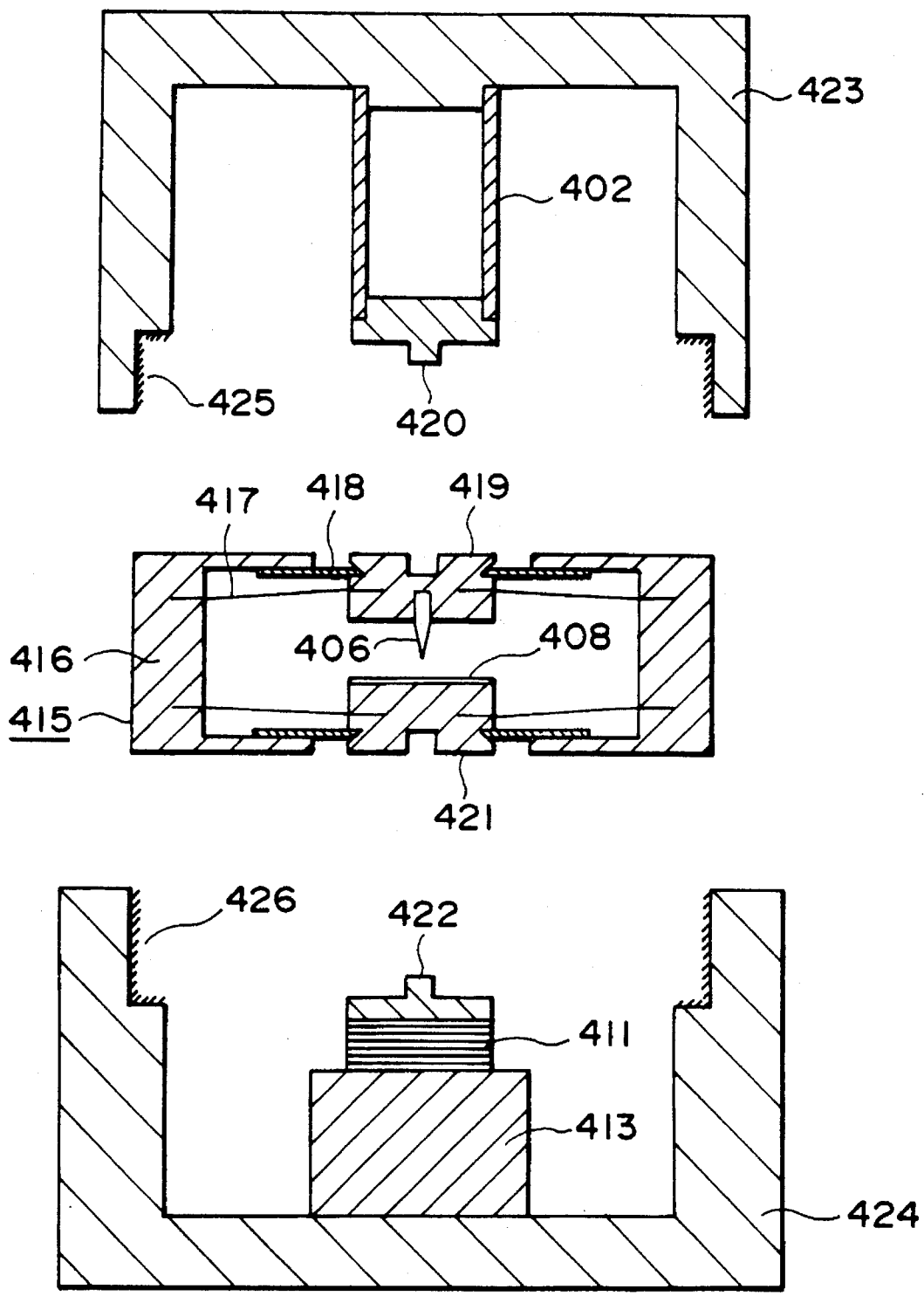

FIGS. 7 and 8 are schematic views mainly showing the sealed container 415 of the fourth embodiment of the present invention, respectively showing the states before and after the setting of the sealed container. A sealed frame 416, which is a main component of the sealed container, is made of aluminum and has a cylindrical shape. Elastic membranes 417, consisting of rubber, are provided at the upper and lower faces of the sealed frame and constitute the sealing portions. The probe socket 419 serves to fix the probe electrode and also works as a lead therefor. A probe pin 420 is mechanically and electrically connected to the probe socket. A recording medium socket 421 serves to fix the recording medium and also works as a lead for the base electrode of the recording medium. The end portions of the elastic membranes are inserted and adhered into recesses formed in the sealed frame 417 and the sockets 419, 421. There are further provided a recording medium pin 422 connected mechanically and electrically to the recording medium socket; a scanner frame 423 fixing the three-dimensional driving mechanism 402 composed of a cylindrical piezoelectric element and supporting the probe pin at an end thereof; and a stage frame 424 provided therein with the X-Y stage 413 supporting the coarse movement mechanism 411 and the recording medium pin 422. The sealed container 415 is so assembled that the central axis of the external part of the sealed frame 416 coincides with that of the probe socket 419 and recording medium socket 421. A fitting part 425 of the scanner frame 423 is so sized as to fit with the external periphery of the sealed frame 416, and is positioned concentrically with the probe pin 420. Also a fitting part 426 of the stage frame 424 is so sized as to fit with the external periphery of the sealed frame 416, and is positioned concentrically with the recording medium pin 422. On the central axis of the probe socket 419 and recording medium socket 421 there is formed the D-shaped holes as shown in FIG. 6, for snugly coupling respectively with correspondingly protruding parts of the probe pin 420 and recording medium pin 422.

In the structure shown in FIG. 7, when the sealed container 415 is pressed into the fitting part 426 of the stage frame 424, the recording medium socket 421 and pin 422 are simultaneously coupled. Then, when the sealed container 415 is pressed into the fitting part 425 of the scanner frame 423, the probe socket 419 and pin 420 are simultaneously coupled. FIG. 8 shows a state in which the locking plate 418 is released by movement with an actuator (not shown). The elastic membranes 417 do not restrict the movement of the probe electrode 406 or the recording medium 408, so that the movements of the three-dimensional driving mechanism 402, coarse movement mechanism 411 and X-Y stage 413 are directly transmitted to the probe electrode 406 and the recording medium 408. The probe pin 420 and the recording medium pin 422 are electrically connected, through signal lines (not shown) and the frame, to the voltage applying unit 405 and the current amplifier 407. Thus, through the couplings of the probe socket 419 and probe pin 420, and of the recording medium socket and recording medium pin, there is accomplished the electrical connections shown in FIG. 5, among the probe electrode 406, recording medium 408, voltage applying unit 405 and current amplifier 407.

The distance between the probe electrode 406 and the recording medium 408 is controlled by the coarse movement mechanism 411. At the recording or reproducing operation, said distance is reduced to within the control range of the three-dimensional driving mechanism 402, which thus effects the scanning operation along the surface of the recording medium 408 and the position control of the probe electrode 406 in the axial direction (vertical direction in the drawing). When the recording or reproducing is not conducted, the locking plate is positioned again to prevent the contact between the probe electrode and the recording medium.

Also in the present embodiment, as in the second embodiment, the probe electrode 406 and the recording medium 408 are enclosed in the sealed frame 416, which is detachable from the apparatus, so that the replacement of the recording medium is made together with said sealed frame, and the sealed state of the frame need not be varied at the replacement of the medium. Also since the probe electrode 406 and the recording medium 408 can be replaced in a mutually close relationship, the alignment of these members can be made promptly after the frame is loaded.

Also the structure of the present embodiment, in which the probe electrode 406 and the recording medium 408 requiring high precision are constructed as a unit, allows to manufacture said unit in a process separate from that for the coarse movement mechanism, circuits and interfaces not requiring high precision. Thus the assembling of the apparatus is facilitated and the productivity is improved. Also the parts of high precision can be replaced by the detaching of said unit, so that the maintenance work is facilitated in case of a failure.

Particularly this fourth embodiment, in which the sealed container do not include the drive means but the probe electrode and the recording medium only, allows to provide a compact sealed container with simpler structure and assembling, and with reduced possibility of dust generation in the container, thereby improving the reliability of the apparatus.

Though the present embodiment employs only one probe electrode, there may also be employed plural probe electrodes.

Figure 9A:
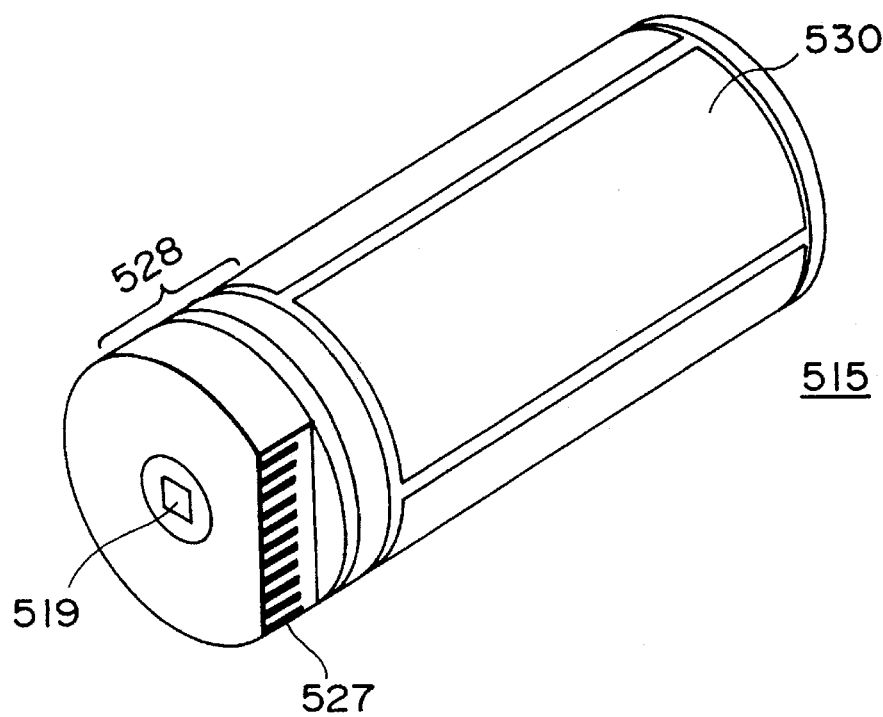
FIG. 9A is an external view of the sealed container employed in a fifth embodiment of the present invention.
Figure 9B:
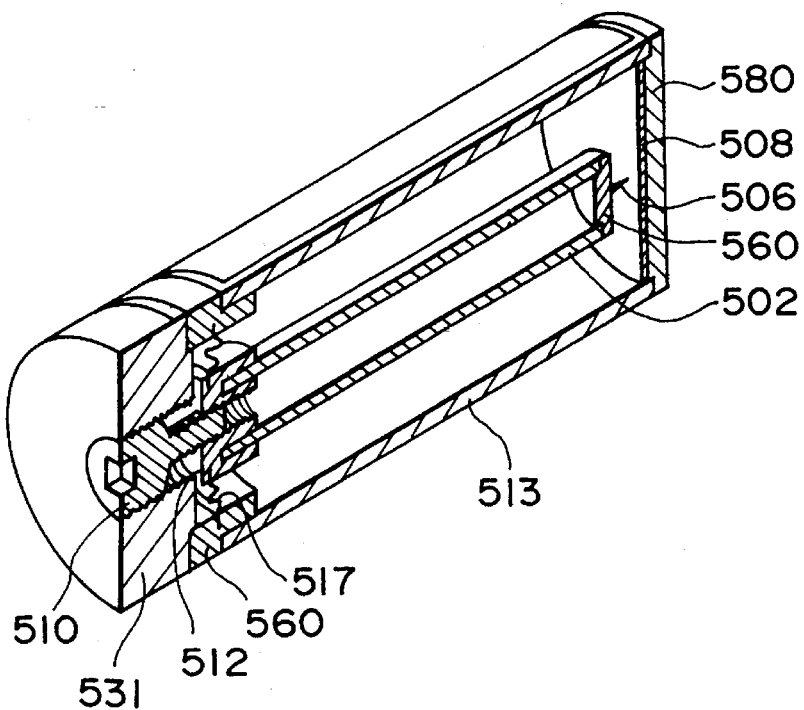
FIG. 9B is a partially cut-off perspective view thereof.
Figure 10:
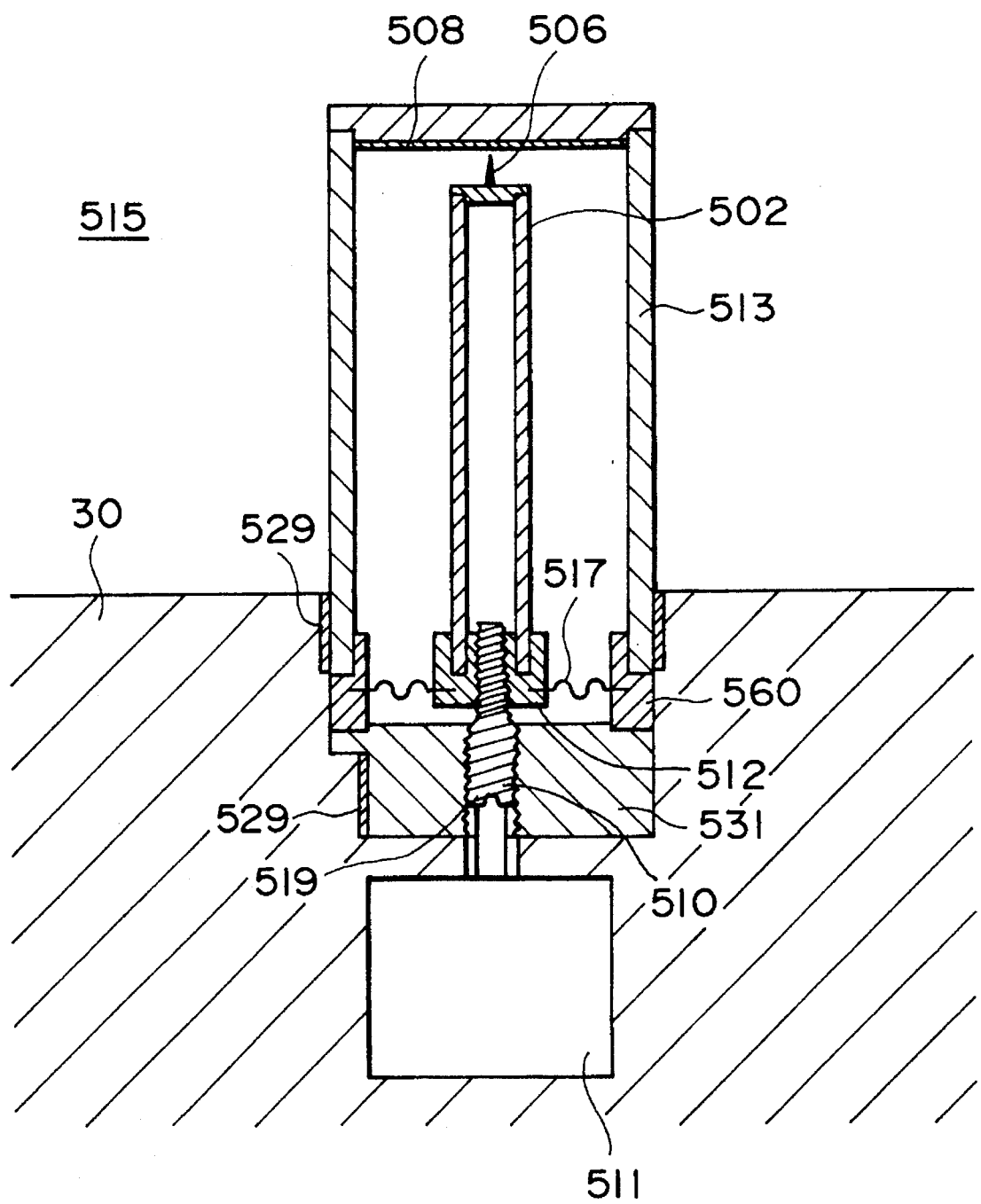
FIG. 10 is a schematic view showing the mode of setting of the sealed container in said embodiment.

FIGS. 9A, 9B and 10 show a fifth embodiment of the present invention, wherein FIG. 9A is an external view of a sealed container 515, and FIG. 9B is a partially cut-off perspective view thereof. In FIGS. 9A, 9B and 10 there are shown electrodes 527 electrically connected with a probe electrode 506, a recording medium 508 and a three-dimensional driving mechanism in said sealed container; an X-Y stage electrode 530; a D-shaped fitting part 528 for positioning of said container in the apparatus; and a squareholed socket 519 for mechanical connection of the coarse movement mechanism.

In FIG. 9B there are further shown a three-dimensional driving mechanism 502 composed of a cylindrical piezoelectric element; a probe electrode 506; a probe support 560 for mounting the probe electrode 506 on the three-dimensional driving mechanism 502; a recording medium 508; an X-Y stage 513 composed of a cylindrical piezoelectric element; a medium support 580 for mounting the recording medium on the X-Y stage 513; an elastic membrane 517 composed of a stainless steel diaphragm; a frame 560 fixing the external periphery of the elastic membrane 517 and constituting the container with the same diameter as that of the X-Y stage 513 and a fixing screw to be explained later; a differential screw 510 for positioning the probe electrode 506 and the recording medium 508 close by coarse motion; a fixing screw 531 constituting the fitting part; and a screw 512 for fixing the internal periphery of the elastic membrane 517 and also fixing an end of the three-dimensional movement mechanism 502. The sealed space is enclosed by the probe support 560, three-dimensional driving mechanism 502, screw 512, elastic membrane 517, frame 560, X-Y stage 513 and medium support 580, and is filled with clean, dry nitrogen gas. The probe electrode 506 can be moved closer to the recording medium 508 by the rotation of the differential screw 510.

FIG. 10 shows a state in which the sealed container 515 of the fifth embodiment is set on the main body of the apparatus 30 and the probe electrode is moved closer to the recording medium. A coarse movement mechanism 511, utilizing a stepping motor, rotates the differential screw 510 through the socket 519, thereby moving slightly the screw 512 and positioning the probe electrode 506 closer to the recording medium 508.

Electrode connectors 529, provided on the main body of the apparatus and electrically connected with the voltage applying unit, current amplifier, X-Y scanning drive circuit, servo circuit, X-Y stage drive circuit etc. are so positioned as to be in contact with the electrodes 527 and the X-Y stage electrode 530 when the sealed container 515 is set on the main body 30. Said contact of the connectors 529 with the electrodes 527 and the X-Y stage electrode 530 completes the electric connections as shown in FIG. 5, whereby enabled are the voltage application between the probe electrode 506 and the recording medium 508, detection of tunnel current, and transmission of control signals to the three-dimensional driving mechanism 502 and to the X-Y stage 513.

At the recording or reproducing operation, the distance between the probe electrode 506 and the recording medium 508 is brought, by coarse movement mechanism 511, to the control range of the three-dimensional driving mechanism 502, which performs the scanning motion along the surface of the recording medium and the position control of the probe electrode in the axial direction thereof.

Though the present embodiment employs only one probe electrode, there may be employed plural probe electrodes.

Also in this fifth embodiment, as in the foregoing second embodiment, the probe electrode 506 and the recording medium 408 alone are enclosed in the sealed frame 515 which is rendered detachable from the apparatus, so that the replacement of the recording medium is made together with said sealed frame, and the sealed state of the frame need not be varied at the replacement of the medium. Also since the probe electrode 506 and the recording medium 508 can be replaced in a mutually close relationship, the alignment of these members can be made promptly after the frame is loaded.

Also the structure of the present embodiment, in which the probe electrode 506 and the recording medium 508 requiring high precision are constructed as a unit, allows to manufacture said unit in a process separate from that for other low precision components such as the coarse movement mechanism, electric circuits and interfaces. Thus the assembling of the apparatus is facilitated and the productivity can be improved. Also the parts of high precision can be replaced by the detaching of said unit, so that the maintenance work is facilitated in case of a failure.

In the following there will be explained a sixth embodiment of the present invention, with reference to FIGS. 11 to 14.

FIG. 11 is an external view of a card-shaped unit including a sealed structure, provided with electrodes 627 for signal exchange with the main body of the apparatus, and a window 731 for accepting a mechanism for X-Y drive of the medium.

FIG. 12 is a schematic view of a mechanism, for driving the probe electrodes in the Z-direction, perpendicular to the surface of said recording medium. There are shown probe electrodes 606; bimorph beams 800; and a wiring area 802 for driving. The bimorph beam 800 and the probe electrode 606 can be prepared by a known process called micromechanics or micromachining, as reported by K. E. Petersen, Proc. IEEE 70, 420(1982) and T. R. Albrecht et al., 4th international Conference on STM/STS ( STM '89) PI-29, S10-2. The beam 800 has a cross-sectional structure of upper electrode (Au)/insulating film ($Si_3N_4$)/piezoelectric film (ZnO)/insulating film ($Si_3N_4$)/middle electrode (Au)/insulating film ($Si_3N_4$)/piezoelectric film (ZnO)/insulating film ($Si_3N_4$)/lower electrode (Au) and has dimensions of 750 μm in length, 150 μm in width and 7.5 μm in thickness. By the application of voltages of mutually opposite polarities to the upper and lower electrodes with respect to the middle electrode causes the movement of the end of the bimorph beam 800 or the probe in the Z-direction, by about 5 μm in response to a voltage of ±15 V. The tungsten probe electrode 606 is electrically connected through the bimorph beam 800 and the wiring area 802 to one of the electrodes 627. Also a circuit for transmitting the control signal from the electrodes 627 to the bimorph beam 800 is formed on the wiring area 802.

Figure 13:
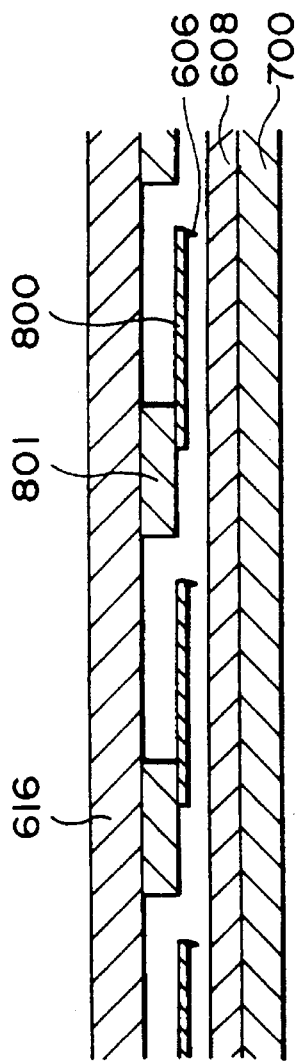
FIG. 13 is a cross-sectional view showing the positional relationship between the probe electrodes and the recording medium in said embodiment.

FIG. 13 is a cross-sectional view showing the positional relationship between the probe electrode and the recording medium, wherein shown are support members 801 supporting the bimorph beams 800; a sealed frame 616 supporting said support members and constituting the structure of the card-shaped unit; a recording medium 608; and a substrate 700 for fixing the recording medium for connection with the X-Y driving mechanism to be explained later.

Figure 14:
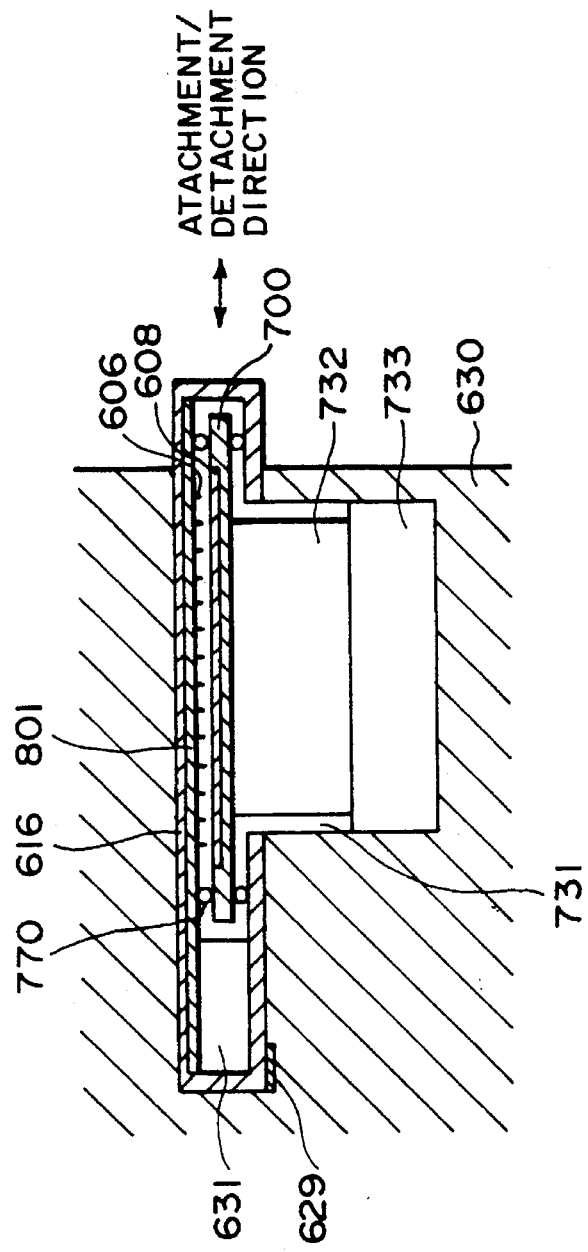
FIG. 14 is a schematic view showing the mode of setting of a card-shaped unit in said embodiment.

FIG. 14 shows a state in which the card-shaped unit of the sixth embodiment is set in the main body 630 of the apparatus, and an X-Y driving mechanism 732, having a piezoelectric element with an inch-worm structure, is inserted into the window 731 by means of a vertically shifting mechanism.

The support member 700 for the recording medium is provided, on a side thereof opposite to said recording medium 608, with a coupling part with the X-Y driving mechanism 732. There are also shown a driving circuit 631 including a selector for selecting the bimorph beam 800 and the probe electrode 606 to be activated; electrode connectors 629 for the supply of control signals and electric power from the control system of the main body to the card-shaped unit; and a packing 770 consisting of a mechanical seal for constituting the sealed structure and maintaining a constant distance between the recording medium 608 and the support member 801.

The sealed space is enclosed by the support 801, sealed frame 616, packing 770 and substrate 700, and is filled with clean paraffin oil.

The card-shaped unit is attached to or detached from the main body 630 in a direction indicated by an arrow. At the attaching or detaching operation, the vertically shifting mechanism 733 lowers the X-Y driving mechanism 732 to a position not interfering with the movement of the card-shaped unit. Upon insertion of the unit into the main body 630, electrical connections are made by the contact of the connectors 629 with the electrodes 627.

In the circuit in the main body, the X-Y scanning drive circuit shown in FIG. 5 is connected to the X-Y driving mechanism 732. Also servo circuits are provided respectively corresponding to the plural bimorph beams 800 and are connected thereto. Also a voltage applying unit and a current amplifier are provided for each bimorph beam, but the coarse movement driving circuit and the X-Y stage driving circuit are dispensed with. The circuits are completed by the contact of the electrodes 627 and the connectors 629.

At the recording or reproducing operation, the distance between the probe electrode 606 and the recording medium 608 is controlled by the voltage applied to each bimorph beam 800, and the scanning motion along the surface of the recording medium 608 is achieved by the X-Y driving mechanism 732, at the same time for all the bimorph beams.

Also in this embodiment, as in the foregoing second embodiment, the probe electrodes 606 and the recording medium 608 alone are enclosed in the card-shaped unit which is rendered detachable from the main body of the apparatus, so that the replacement of the recording medium is made together with said card-shaped unit, and the sealed state of the unit need not be varied at the replacement of the medium. Also since the probe electrodes 606 and the recording medium 608 can be replaced in a mutually close relationship, the alignment of these members can be made promptly after the unit is loaded.

Also the structure of the present embodiment, in which the probe electrodes 606 and the recording medium 608 requiring high precision are constructed as a unit, allows to manufacture said unit in a process separate from that for other low precision components such as the coarse movement mechanism, electric circuits and interfaces. Thus the assembling of the apparatus is facilitated and the productivity can be improved. Also the parts of high precision can be replaced by the detaching of said unit, so that the maintenance work is facilitated in case of a failure.

Furthermore, said sixth embodiment enables highly precise manufacture of the probe electrodes and bimorph beams by so-called micromechanic process, with possibility of constructing the drive circuits on the substrate of the bimorph beams. Also the paraffin oil filled in the sealed space serves to stabilize the operation by attenuating the vibration of the bimorph beams 800, and to prevent the eventual contact between the probe electrodes 606 and the recording medium 608.

The foregoing embodiments are applicable not only to the recording medium and reproducing apparatus but also to an apparatus for recording or reproducing only.

We claim:

1. An apparatus for performing at least one of information recording and reproducing utilizing a recording medium, comprising:
   a probe electrode for performing at least one of information recording on and information reproduction from a recording medium;
   means for at least one of the information recording on and information reproduction from said recording medium by using said probe electrode, said at least one of the information recording and reproduction means including voltage applying means for applying a voltage between said probe electrode and said recording medium for the at least one of the information recording on and information reproduction from said recording medium;
   a seal member for containing at least said probe electrode and said recording medium in a sealed state separated from ambient atmosphere; and
   a main body for supporting said seal member, said seal member being detachable from said main body,
   wherein said voltage applying means is provided in said main body, said main body and said seal member are respectively provided with contact electrodes for electrically connecting said voltage applying means with least one of said probe electrode and said recording medium, and said contact electrodes are so positioned as to mutually contact when said seal member is mounted on said main body.

2. An apparatus according to claim 1, wherein a tunnel current generated between said probe electrode and said recording medium is detected on the basis of a voltage applied by said voltage applying means, thereby to reproduce information from said recording medium.

3. An apparatus according to claim 1, further comprising drive means for causing a relative motion between said probe electrode and said recording medium to scan said recording medium by said probe electrode.

4. An apparatus according to claim 3, wherein said seal member also contains said drive means in a sealed state.

5. An apparatus according to claim 1, wherein sealed space of said seal means contains atmosphere capable of preventing time-dependent change of at least one of said probe electrode and said recording medium.

6. An apparatus according to claim 5, wherein said sealed space is maintained at high vacuum.

7. An apparatus according to claim 5, wherein said sealed space contains purified gas.

8. An apparatus according to claim 5, wherein said sealed space contains dried nitrogen gas.

9. An apparatus according to claim 5, wherein said sealed space contains paraffin oil.

10. An information recording carrier including a recording medium for at least one of information recording and reproduction by an apparatus for performing at least one of information recording and reproduction, said apparatus including voltage applying means for applying a voltage for the at least one of the information recording on and information reproduction from said recording medium, comprising:
    a probe electrode for at least one of information recording on and information reproduction from said recording medium, said voltage applying means applying the voltage between said probe electrode and said recording medium; and
    a sealed frame for sealing said recording medium and said probe electrode for separation from ambient atmosphere,
    wherein said sealed frame is attachable to and detachable from the apparatus for information recording and reproduction, and
    wherein said sealed frame comprises a contact electrode for voltage supply from the apparatus for performing at least one of information recording and reproduction, said contact electrode being so positioned in said sealed frame as to be in electrical contact with said voltage applying means when said sealed frame is attached.

11. A carrier according to claim 10, wherein a tunnel current generated between said probe electrode and said recording medium is detected upon the application of a voltage between said probe electrode and said recording medium, thereby to reproduce information from said recording medium.

12. A carrier according to claim 10, further comprising drive means for causing a relative motion between said probe electrode and said recording medium to scan said recording medium by said probe electrode.

13. A carrier according to claim 12, wherein said sealed frame also contains said drive means.

14. A carrier according to claim 10, wherein sealed space of said sealed frame contains atmosphere capable of preventing time-dependent change of at least one of said probe electrode and said recording medium.

15. A carrier according to claim 14, wherein said sealed space is maintained at high vacuum.

16. A carrier according to claim 14, wherein said sealed space contains purified gas.

17. A carrier according to claim 14, wherein said sealed space contains dried nitrogen gas.

18. A carrier according to claim 14, wherein said sealed space contains paraffin oil.

19. An information recording carrier including a recording medium for at least one of information recording and reproduction by an apparatus for performing at least one of information recording and reproduction, said apparatus including voltage applying means for applying a voltage for at least one of information recording on and information reproduction from said recording medium comprising:
    a probe electrode for at least one of information recording on and information reproduction from said recording medium, said voltage applying means applying the voltage between said probe electrode and said recording medium; and
    a frame supporting said recording medium and said probe electrode, attachable to and detachable from the apparatus for performing at least one of information recording and reproduction,
    wherein said frame comprises a contact electrode for voltage supply from the apparatus for performing at least one of information recording and reproduction, said contact electrode being so positioned in said frame as to be in electrical contact with said voltage applying means when said frame is attached.

20. An apparatus for at least one of information recording and reproduction utilizing a recording medium having at least one recording surface, comprising:
    a plurality of probe electrodes each for information recording on and information reproduction from said one recording surface, said probe electrodes being relatively movable to said one recording surface along said one recording surface;
    means for at least one of information recording on and information reproduction from said one recording surface by using each of said probe electrodes relatively moved to said one recording surface along said one recording surface, said at least one of the information recording and reproduction means including voltage applying means to apply voltage between said probe electrodes and said recording medium for the at least one of information recording on and information reproduction from said one recording surface;

a seal member for containing at least said probe electrodes and said one recording surface in a sealed state separated from ambient atmosphere; and holding means for holding said seal member, said seal member being detachable from said holding means,
wherein said voltage applying means is provided in said holding means, said holding means and said seal member are respectively provided with contact electrodes for electrically connecting said voltage applying means with at least one of said probe electrodes and said recording mediums, and said contact electrodes are so positioned as to mutually contact when said seal member is held by said holding means.

21. An apparatus according to claim 20, further comprising driving means for driving said one recording surface so as to move said probe electrodes relatively to said one recording surface along said one recording surface.

22. An apparatus according to claim 21, wherein sealed space of said seal member contains atmosphere capable of preventing time-dependent change of at least one of said probe electrodes and said recording medium.

23. An apparatus according to claim 22, wherein said sealed space contains paraffin oil.

24. An apparatus according to claim 20 wherein said probe electrodes are arranged two-dimensionally.

25. An information recording carrier including a recording medium having a recording surface for at least one of information recording and reproduction by an apparatus for performing at least one of information recording and reproduction, said apparatus including a voltage applying circuit to apply voltage for the at least one of information recording on and information reproduction from said one recording surface comprising:

a plurality of probe electrodes each for at least one of information recording on and information reproduction from said one recording surface, said probe electrodes being relatively movable to said one recording surface along said one recording surface, said voltage applying circuit applying the voltage between said recording medium and said probe electrodes relatively moved to said one recording surface along said one recording surface; and a sealed frame for sealing said one recording surface and said probe electrodes for separation from ambient atmosphere,
wherein said sealed frame is attachable to and detachable from the apparatus for performing the at least one of the information recording and reproduction,
wherein said sealed frame comprises contact electrode means for supplying voltage from said voltage applying circuit, said contact electrode means being so positioned in said sealed frame as to be in electrical contact with said voltage applying circuit when said sealed frame is attached to said apparatus.

26. An information recording carrier according to claim 25, further comprising an insert window for a driver applied in the apparatus for information recording and/or reproduction, said driver driving said one recording surface so as to move said probe electrodes relative to said one recording surface along said one recording surface.

27. An information recording carrier according to claim 25, wherein sealed space of said sealed frame contains atmosphere capable of preventing time-dependent change of at least one of said probe electrodes and said recording medium.

28. An information recording carrier according to claim 27, wherein said sealed space contains paraffin oil.

29. An apparatus according to claim 25, wherein said probe electrodes are arranged two-dimensionally.

30. An apparatus for at least one of information recording and reproduction utilizing a recording medium, comprising:

an information container including,
i) a probe electrode for at least one of information recording on and information reproduction from a recording medium, and
ii) a frame for containing at least said probe electrode and said recording medium;

a container holder for detachably holding said information container;

means for at least one of information recording on and information reproduction from said recording medium by using said probe electrode of said information container held by said container holder including a voltage applying means to apply a voltage between said probe electrode and said recording medium for the at least one of the information recording on and information reproduction from said recording medium; and control means to control an interval between said probe electrode and said recording medium so that said probe electrode relatively approaches said recording medium when said container holder holds said information container,
wherein said frame comprises a contact electrode for supplying the voltage from said voltage applying means, said contact electrode being so positioned in said frame as to be in electrical contact with said voltage applying means when said container is held by said container holder.

31. An apparatus according to claim 30, wherein said frame is used to seal said recording medium and said probe electrodes for separation from ambient atmosphere.

32. An apparatus according to claim 31, wherein sealed space of said frame contains atmosphere capable of preventing time-dependent change of at least one of said probe electrodes and said recording medium.

33. An apparatus for at least one of information recording on and reproduction from a recording medium by using a probe electrode, comprising:

a holder for detachably holding a composition which includes said recording medium and said probe electrode;

a circuit for at least one of information recording on and information reproduction from said recording medium by using said probe electrode of said composition held by said holder, said circuit including a voltage applying circuit to apply a voltage between said probe electrode and said recording medium for the at least one of the information recording and information reproduction from said recording medium; and a control system to control an interval between said probe electrode and said recording medium so that said probe electrode relatively approaches said recording medium when said holder holds said composition,
wherein said holder comprises a contact electrode for supplying the voltage from said voltage applying circuit, said contact electrode being so positioned in said holder as to be in electrical contact with said voltage applying means when said composition is held by said holder.

34. An apparatus for at least one of information recording and reproduction utilizing a recording medium, comprising:
- a probe electrode for at least one of information recording on and information reproduction from the recording medium;
- means for at least one of information recording on and reproduction from said recording medium by using said probe electrode including voltage applying means to apply a voltage between said probe electrode and said recording medium for the at least one of the information recording on and information reproduction from said recording medium;
- x-y driving means to drive said recording medium in directions along a surface of said recording medium so as to scan said recording medium with said probe electrodes;
- an apparatus body; and
- a seal member for containing at least said probe electrode and said recording medium in a sealed state separated from ambient atmosphere, said seal member being attachable to and detachable from said apparatus body,
  - wherein said x-y driving means is arranged outside a sealed space of the seal member and is connected to said seal member when said seal member is attached to said apparatus body.

35. An apparatus for at least one of information recording on and reproduction from a recording medium by using a probe electrode, comprising:
- a holder for detachably holding a composition which includes said recording medium and said probe electrode; and
- a circuit for at least one of information recording on and information reproduction from said recording medium by using said probe electrode of said composition held by said holder including a voltage applying circuit to apply a voltage between said probe electrode and said recording medium for the at least one of the information recording on and information reproduction from said recording medium,
  - wherein said holder comprises a contact electrode for supplying the voltage from said voltage applying circuit, said contact electrode being so positioned in said holder as to be in electrical contact with said voltage applying circuit when said composition is held by said holder.

36. An information recording carrier including a recording medium in which at least one of information recording and reproduction is performed by an apparatus for performing at least one of information recording and reproducing, comprising;
- a probe for performing at least one of information recording on and reproducing from the recording medium; and
- seal means for sealing the recording medium and the probe from ambient atmosphere, said seal means being attachable to and detachable from the apparatus for information recording and reproducing,
  - wherein said seal means comprises a contact electrode by which a voltage is applied from the apparatus for information recording and reproducing, said contact electrode being positioned in said seal means so as to electrically contact a part of said apparatus where the voltage is applied when said seal means is attached to the apparatus for performing information recording and reproducing.

37. An information recording carrier according to claim 36, wherein information is recorded on the recording medium by applying a voltage between the probe and the recording medium.

38. An information recording carrier according to claim 36, wherein information is reproduced from the recording medium by detecting a tunnel current flowing between the probe and the recording medium when a voltage is applied between them.

39. An information recording carrier according to claim 36, further comprising driving means for relatively moving the probe and recording medium so that the recording medium is scanned by the probe.

40. An information recording carrier according to claim 39, wherein said driving means is also sealed by said seal means.

41. An information recording carrier according to claim 36, wherein a driving means for relatively moving the probe and the recording medium so that the recording medium is scanned by the probe is outside a space sealed by said seal means.

42. An information recording carrier according to claim 36, wherein a space sealed by said seal means contains an atmosphere capable of preventing a time-dependent change of at least one of the probe and the recording medium.

43. An information recording carrier including a recording medium in which at least one of information recording and reproduction is performed by an apparatus for performing at least one of information recording and reproducing, comprising;
- a probe for performing at least one of information recording on and reproducing from the recording medium; and
- a frame for supporting the recording medium and the probe, said frame being attachable to an detachable from the apparatus for performing the at least one of the information recording and reproducing,
  - wherein said frame comprises a contact electrode for voltage supply from the apparatus for performing at least one of information recording and reproduction, said contact electrode being so positioned in said frame as to be in electrical contact with a part of the apparatus for voltage application when said frame is attached.

44. An information recording carrier including a recording medium in which at least one of information recording and reproduction is performed by an apparatus for performing at least one of information recording and reproducing, comprising;
- plural probes for performing at least one of information recording on and reproducing from the recording medium; and
- seal means for sealing the recording medium and the probes from ambient atmosphere, said seal means being attachable to and detachable from the apparatus for performing the at least one of the information recording and reproducing,
  - wherein said seal means comprises a contact electrode for voltage supply from the apparatus for performing at least one of information recording and reproduction, said contract electrode being so positioned in said seal means as to be in electrical contact with a part of the apparatus for voltage application when said seal means is attached.

45. An information recording carrier according to claim 44, wherein a driving means for relatively,moving the probe and the recording medium so that the recording medium is scanned by the probe is outside a space sealed by said seal means.

46. An information recording carrier including a recording medium in which at least one of information recording and reproducing is performed by an apparatus for performing at least one of information recording and reproducing, comprising;

a probe for performing information recording on and reproducing from the recording medium; and seal means for sealing the recording medium and the probe from ambient atmosphere and comprising an electrode for communicating a signal with the apparatus, and an area into which a driving mechanism of the apparatus for driving the recording medium is inserted, wherein said seal means is attachable to and detachable from the apparatus for information recording and reproducing.

47. An apparatus for performing at least one of information recording on and reproducing from a recording medium, comprising:

holding means for holding a containing means in which a recording medium and a probe for the at least one of information recording on and reproducing from the recording medium are contained, the containing means being attachable to and detachable from said holding means;

first driving means for performing a position control of the probe, said first driving means being connected to the containing means when the containing means is attached to said holding means; and second driving means for driving the recording medium, said second driving means being connected to the containing means when the containing means is attached to said holding means.

48. An apparatus according to claim 47 further comprising means for applying a voltage between the probe and the recording medium, wherein information is recorded on the recording medium by application of the voltage by the applying means.

49. An apparatus according to claim 47, further comprising means for applying a voltage between the probe and the recording medium, wherein information is reproduced from the recording medium by detecting a tunnel current flowing between the probe and the recording medium by application of the voltage by the applying means.

50. An apparatus for performing at least one of information recording on and reproducing from a recording medium, comprising:

holding means for holding a containing means in which the recording medium and a probe for the at least one of information recording on and reproducing from the recording medium are sealed, the containing means being attachable to and detachable from said holding means;

first driving means for performing a position control of the probe, said first driving means being connected to the containing means when the containing means is attached to said holding means; and second driving means for driving the recording medium, said second driving means being connected to the containing means when the containing means is attached to said holding means.

51. An apparatus according to claim 50, further comprising means for applying a voltage between the probe and the recording medium, wherein information is recorded on the recording medium by application of the voltage by the applying means.

52. An apparatus according to claim 50, further comprising means for applying a voltage between the probe and the recording medium, wherein information is reproduced from the recording medium by detecting a tunnel current flowing between the probe and the recording medium by application of the voltage by the applying means.

* * * * *